United States Patent
Hoang et al.

(10) Patent No.: US 7,078,469 B2
(45) Date of Patent: Jul. 18, 2006

(54) HALOGENATED ORGANIC PARTICLES FOR CATALYST SUPPORTS

(75) Inventors: Peter Phung Minh Hoang, Calgary (CA); Xiaoliang Gao, Calgary (CA); Jessie Anne Leighton, Calgary (CA); Matthew Gerald Kowalchuk, Calgary (CA)

(73) Assignee: Nova Chemicals (International) S.A. (CH)

( * ) Notice: Subject to any disclaimer, the term of this patent is extended or adjusted under 35 U.S.C. 154(b) by 301 days.

(21) Appl. No.: 10/803,129

(22) Filed: Mar. 17, 2004

(65) Prior Publication Data

US 2005/0075467 A1    Apr. 7, 2005

(30) Foreign Application Priority Data

Mar. 28, 2003  (CA) .................................... 2423921

(51) Int. Cl.
*C08F 4/649* (2006.01)
*C08F 4/02* (2006.01)
*C08F 4/642* (2006.01)

(52) U.S. Cl. ............... 526/137; 526/141; 526/160; 526/161; 526/165; 502/114; 502/119; 502/123; 502/155; 502/162; 502/167

(58) Field of Classification Search ............... 502/114, 502/119, 123, 155, 162, 167; 526/137, 141, 526/160, 161, 165
See application file for complete search history.

(56) References Cited

U.S. PATENT DOCUMENTS

| | | | |
|---|---|---|---|
| 3,231,550 A | 1/1966 | Manyik et al. ............ 260/88.2 |
| 4,100,337 A | 7/1978 | Noshay et al. ............. 526/130 |
| 4,404,344 A | 9/1983 | Sinn et al. .................. 526/160 |
| 4,407,727 A | 10/1983 | Harris et al. ................ 502/115 |
| 4,623,707 A | 11/1986 | Bedell et al. ............... 526/142 |
| 4,632,912 A | 12/1986 | Bedell et al. ............... 502/122 |
| 4,808,561 A | 2/1989 | Welborn, Jr. ................ 502/104 |
| 4,900,706 A | 2/1990 | Sasaki et al. ............... 502/116 |
| 5,118,648 A | 6/1992 | Furtek et al. ............... 502/116 |
| 5,139,985 A | 8/1992 | Barbé et al. ................ 502/109 |
| 5,219,817 A | 6/1993 | McDaniel et al. .......... 502/228 |
| 5,219,962 A | 6/1993 | McDaniel et al. .......... 526/126 |
| 5,221,654 A | 6/1993 | McDaniel et al. .......... 502/228 |
| 5,221,655 A | 6/1993 | McDaniel et al. .......... 502/228 |
| 5,221,720 A | 6/1993 | McCaniel et al. .......... 526/135 |
| 5,434,116 A | 7/1995 | Sone et al. ................. 502/103 |
| 5,463,000 A | 10/1995 | Miyoshi et al. ............. 526/119 |
| 5,498,582 A | 3/1996 | Krause et al. .............. 502/103 |
| 5,554,775 A | 9/1996 | Krishnamurti et al. ......... 556/7 |
| 5,637,659 A | 6/1997 | Krishnamurti et al. ...... 526/133 |
| 6,869,652 B1 * | 3/2005 | Kunz et al. ................ 428/36.5 |

FOREIGN PATENT DOCUMENTS

| | | |
|---|---|---|
| EP | 0 344 755 B2 | 9/1997 |
| JP | 9-67407 | 11/1997 |
| WO | WO 96/35726 | 11/1996 |

* cited by examiner

Primary Examiner—Caixia Lu
(74) Attorney, Agent, or Firm—Kenneth H. Johnson

(57) ABSTRACT

Polymeric supports, which have been treated with a halosulfonic acid, increase the activity of single-site catalysts used with aluminoxane co-catalysts, resulting in improved ethylene polymerization. The present invention seeks to provide polymeric catalyst supports which have been treated with halosulfonic acid for improved activity.

13 Claims, No Drawings

HALOGENATED ORGANIC PARTICLES FOR CATALYST SUPPORTS

FIELD OF THE INVENTION

The present invention relates to polymeric supports suitable for use in association with catalysts, preferably single site type catalysts, activated with aluminoxane, particularly the supports which have been treated with halosulfonic acid, preferably fluorosulfonic acid.

BACKGROUND OF THE INVENTION

There are a number of patents that disclose the use of polymeric supports for olefin polymerization catalysts. Generally the supports are polyolefins as illustrated for example by Atlantic Richfield's U.S. Pat. No. 4,407,727; Quantum's WO 96/35726; and the abstract of Mitsubishi's JP 67407. Polyethylene and polypropylene are not polymers prepared from $C_{4-12}$ vinyl monomers and thus the references do not teach or disclose the subject matter of the present patent application.

There are a fairly large number of patents which teach using polymeric supports comprising styrene and optionally a cross-linking agent such as divinyl benzene and/or polymeric supports such as poly(methyl methacrylate). These patents are illustrated by U.S. Pat. Nos. 4,623,707; 4,632,912; 5,139,985; 4,900,706; 5,463,000; 5,118,648; 5,498,582; and EP 344 755. However, these references do not teach treating the polymeric support with a halosulfonic acid.

The use of an aluminoxane as a cocatalyst for ethylene polymerization catalyst was reported by Manyik et al. in U.S. Pat. No. 3,231,550.

Subsequently, Kamisky and Sinn discovered that aluminoxanes are excellent co-catalysts for metallocene catalysts, as disclosed in U.S. Pat. No. 4,404,344.

The use of a supported aluminoxane/metallocene catalyst is further described in, for example, U.S. Pat. No. 4,808,561.

The use of fluorided alumina as a support for Phillips type chromium catalysts has been widely disclosed in the patent literature. U.S. Pat. Nos. 5,221,720; 5,221,655; 5,221,654; 5,219,962 and 5,219,817 (all McDaniel et al. and assigned to the Phillips Petroleum Company) relate to this art. Also U.S. Pat. No. 4,100,337 (Noshay et al. assigned to the Union Carbide Corporation) teaches the use of fluorided silica supports for chromium polymerization catalysts.

The Applicants have now discovered that the use of a polymeric support which has been treated with (directly halogenated with) a halosulfonic acid improves the productivity of Group IV metal catalysts which are activated with an aluminoxane activator.

SUMMARY OF THE INVENTION

The present invention provides a polymeric support having a particle size from 1 to 300 microns, surface area from 100 to 1,500 m$^2$/g and a pore volume of at least 0.1 cm$^3$/g of support for use in association with a catalyst system comprising a co-catalyst in an amount from 0.01 to 0.8 g per g of support said co-catalyst having the formula $R^1{}_2AlO(R^1AlO)_mAlR^1{}_2$ wherein each $R^1$ is independently selected from the group consisting of $C_{1-20}$ hydrocarbyl radicals and m is from 3 to 50 of said support comprising the suspension or emulsion polymerization product of a feedstock comprising:

(i) from 60 to 99 weight % of one or more $C_{4-12}$ vinyl monomers selected from the group consisting of styrene, alpha-methyl styrene, para-methyl styrene and $C_{1-4}$ alkyl esters of $C_{3-6}$ unsaturated carboxylic acids;

(ii) from 40 to 1 weight % of a crosslinking agent selected from the group consisting of divinyl benzene, divinyl toluene, pentaerythritol di- and tri-acrylates and pentaerythritol di- and tri-methacrylates;

and said support being treated with, (iii) from 0.01 to 5 mmol per gram of support of a halosulfonic acid;

(iv) from 0 to 10 mmol per gram of support of a compound of the formula M $(R^2)_a(OR^2)_b(X)_c$ wherein M is a metal atom selected from the group consisting of Mg, Al and Zn, $R^2$ is a $C_{1-10}$ alkyl radical and a, b, and c are integers from 0 to 3 provided the sum of a+b+c=the valence of M; and (v) from 0 to 5 mmol per gram of support of a bulky amine.

The present invention further provides a catalyst system comprising the above support together with a single site catalyst and a process for the polymerization of one or more olefins using such supported catalyst systems. Preferably the present invention provides a process for preparing ethylene copolymers which comprises contacting ethylene and at least one $C_{3-8}$ alpha olefin under polymerization conditions in the presence of the above-noted catalyst.

DETAILED DESCRIPTION

The feedstock for the polymeric supports of the present invention comprises:

(i) from 60 to 99, preferably from 90 to 98 weight % of one or more $C_{4-12}$ vinyl monomers; and (ii) from 40 to 1, preferably from 10 to 2 weight % of a crosslinking agent.

The sum of the weight % of said monomers must equal 100.

Some examples of vinyl monomers include styrene, alpha-methyl styrene, para-methyl styrene and $C_{1-4}$ alkyl esters of $C_{3-6}$ unsaturated carboxylic acids. The styrenic monomers such as styrene, alpha-methyl styrene, para-methyl styrene may also be referred to as vinyl aromatic monomers. Some examples of $C_{1-4}$ alkyl esters of $C_{3-6}$ unsaturated carboxylic acids include methyl methacrylate, ethyl methacrylate, butyl methacrylate, methyl acrylate, ethyl acrylate and butyl acrylate.

Some examples of crosslinking agents include divinyl benzene, divinyl toluene, di- and tri-acrylates and di- and tri-methacrylates such as pentaerythritol trimethacrylate.

The polymeric supports may be prepared by conventional suspension or emulsion polymerization techniques. These are well known to those skilled in the art. Generally the monomers are dispersed in a continuous phase, typically water, using one or more surfactant or suspending agents which may be ionic such as long chain (e.g. $C_{12-18}$) fatty acids or derivatives thereof (e.g. sulfonates) and salts thereof (e.g. dodecyl benzene sulfonate) or a non ionic surfactant (e.g. polyoxyethylene sorbitan fatty acid esters such as those sold under the trademark TWEEN). Typically the emulsion also contains a free radical initiator (such as a persulfate (optionally in the presence of a reducing agent) or a peroxide). The emulsion is heated to begin polymerization and the polymerization may be completed in a batch or continuous process.

The selection of the surfactants to some extent controls the size of the final particles in the emulsion polymerization.

Generally the polymeric particles will have a particle size from 0.1 to 1,000, preferably from 1 to 300 microns, a surface area of greater than 10, preferably from 100 to 1,500 m$^2$/g and a pore volume of at least 0.1 cc/g of support.

If desired or required there are several methods which may be used to increase the pore size to volume ratio in the polymeric particles. For example silica may be incorporated into the polymer then dissolved out using a strong base.

The polymeric supports may be purchased commercially from a number of sources, one of which is Aldrich.

The polymeric supports in accordance with the present invention are prepared by direct treatment with a halosulfonic acid such as chlorosulfonic acid or fluorosulfonic acid. Fluorosulfonic acid is readily available and the use thereof is preferred.

Generally the polymeric support may be slurried in a hydrocarbon diluent or solvent. Inert hydrocarbon diluents or solvents typically comprise of a $C_{4-12}$ hydrocarbon which may be unsubstituted or substituted by a $C_{1-4}$ alkyl group, such as butane, pentane, hexane, heptane, octane, cyclohexane, methylcyclohexane or hydrogenated naphtha. An additional solvent is Isopar E ($C_{8-12}$ aliphatic solvent, Exxon Chemical Co.). It should be noted that the polymeric supports may swell in the solvent or diluent but should not readily dissolve because it is crosslinked.

Typically the hydrocarbon solvent or diluent will be deoxygenated and dried by passing through columns to remove oxygen and residual water, etc.

There is no preferred ratio of support to diluent provided the support is thoroughly contacted with the diluent. For example, the polymeric support may comprise from 5 to about 80 weight % of the slurry, preferably from about 10 to 50 weight % of the slurry. The resulting slurry of polymeric support in a solvent or diluent is then directly contacted with the halosulfonic acid. Typically the halosulfonic acid, in pure or concentrated form (e.g. at least 50%, preferably 80% and most preferably pure), is added drop wise to the slurry to provide the appropriate amount of halosulfonic acid for the polymeric support. The slurry may be shaken or stirred at low temperatures typically from about 20° C. to the boiling temperature, preferably from about 20° C. to about 50° C., most preferably from about 20° C. to 30° C., for a reasonable length of time such as over night or for up to about 18 hours after which the slurry is filtered, rinsed and dried generally under vacuum. The resulting treated polymeric support may be separated from the bulk of the solvent or diluent by decanting or by drying typically from room temperature (20° C.) to about 60° C., preferably under vacuum (of less than about 10 torr) and optionally while passing an inert gas such as nitrogen through the separated support and diluent/solvent.

The halosulfonic acid, preferably chloro or fluorosulfonic acid, most preferably fluorosulfonic acid, is added to provide from 0.01 to 5 mmol, preferably from 0.1 to 3 mmol, of halosulfonic acid per gram of support.

In a similar manner a compound of the formula M$(R^2)_a(OR^2)_b(X)_c$ wherein M is a metal atom selected from the group consisting of Mg, Al and Zn; $R^2$ is a $C_{1-10}$ alkyl radical; and a, b, and c are integers from 0 to 3 provided the sum of a+b+c=the valence of M may be added to the support. Typically the compound is added to a slurry of the halosulfonated support in a hydrocarbon diluent or slurry. The compound is added as a suspension or solution, typically from about 15 to 40, preferably from about 20 to 40 weight % of compound in the same or a compatible solvent or diluent respectively. The conditions and the separation techniques are comparable to those described above for the halosulfonic acid. The treatment time may be considerably shorter from in the range from five minutes to six hours, preferably 30 minutes to two hours.

The compound is used in an amount to provide from 0 to 10, preferably 0.5 to 5, most preferably from 1 to 3 mmol of the compound per gram of support.

Suitable compounds include aluminum, zinc or magnesium complexes having an active alkyl group. Zinc alkyls and magnesium alkyls fall within the scope of this definition as do aluminum complexes. Aluminum alkyls (such as tri $C_{1-6}$ alkyl aluminum compounds and particularly tri-isobutyl aluminum) are particularly preferred for resins of cost and convenience. Mixtures of different alkyls such as a mixture of an aluminum alkyl and a magnesium alkyl may also be employed.

The support treated with the halosulfonic acid and the above noted compound may optionally, but preferably, be treated with a bulky amine. As used herein, the term bulky amine refers to an amine having at least one substituent which is bulkier than a methyl group, preferably larger than a butyl group. The bulky substituent(s) may be a $C_{2-10}$ alkyl radical or a $C_{5-10}$ aryl radical. Such radicals may be straight chained, branched or cyclic. Readily available amines such as phenyl dimethyl amine (PhNMe$_2$) are preferred.

The amine may be added to the support using procedures similar to those described above. The amine may be directly (e.g. dropwise without any solvent or diluent if the amine is a liquid) added to the support in an amount from 0 to 5, preferably 0.1 to 3, most preferably 0.1 to 2 mmol per gram of support. The conditions and the separation techniques are comparable to those described above for the halosulfonic acid. The treatment times may be considerably shorter from five minutes up to about 2 hours.

The treated support is then contacted with an aluminoxane compound. The aluminoxane compound has the formula $R^1{}_2AlO(R^1AlO)_mAlR^1{}_2$ wherein each $R^1$ is independently selected from the group consisting of $C_{1-20}$ hydrocarbyl radicals and m is from 3 to 50. Preferably m is from 3 to 30 and preferably $R^1$ is a $C_{1-4}$ alkyl radical. Aluminoxane may be a mixture of various alkyl aluminum compounds and a preferred compound is one where $R^1$ is predominantly (e.g. greater than 90 weight %, preferably greater than 95 weight %) a methyl radical.

The aluminoxane may be prepared or purchased as a solution or suspension, typically from about 15 to 40, preferably from about 20 to 40 weight % of compound in the same or a compatible solvent or diluent respectively. The conditions and separation methods may be comparable to those described above for the halosulfonic acid. The treatment times may range from about one hour to eight hours.

The aluminoxane compound may be added to the support in an amount to provide from 0.01 to 0.8, preferably from 0.01 to 0.4, most preferably from 0.02 to 0.3 g per gram of support.

Finally the treated supported co-catalyst may be contacted with the single site catalyst. The single site catalyst may be added to the treated polymeric support in the form of a solution or suspension, typically from about 15 to 40, preferably from about 20 to 40 weight % of the single site catalyst in the same or a compatible solvent or diluent respectively. The conditions and separation methods may be comparable to those described above for the halosulfonic acid. The treatment times may range from about one hour to eight hours.

The single site catalyst may be used in an amount to provide a molar ratio of aluminum from the co-catalyst (i.e. aluminoxane) to transition metal from 20:1 to 300:1, preferably from 50:1 to 200:1, and most preferably from 50:1 to 150:1.

It is important to note the slurry or suspension of support need not be dried at each step of the procedure. For example the single site catalyst may be added to the support subsequent to the MAO without removal of the diluent.

Typically the catalysts used with the aluminoxane, prepared in accordance with the present invention, comprise a transition metal complex of at least one $C_{5-13}$ ligand containing a 5-membered carbon ring having delocalized bonding within the ring and bound to the metal atom through covalent $\eta^5$ bonds; and said ligand being unsubstituted or up to fully substituted with one or more substituents as described below.

Generally the catalyst may be a single site type catalyst typically comprising a transition metal, preferably an early transition metal (e.g. Ti, Zr and Hf) and generally having two bulky ligands. In many of the well-known single site catalysts typically one of the bulky ligands is a cyclopentadienyl-type ligand. These cyclopentadienyl-type ligands comprise a $C_{5-13}$ ligand containing a 5-membered carbon ring having delocalized bonding within the ring and bound to the metal atom through covalent $\eta^5$ bonds which are unsubstituted or may be further substituted (sometimes referred to in a short form as Cp ligands). Cyclopentadienyl-type ligands include unsubstituted cyclopentadienyl, substituted cyclopentadienyl, unsubstituted indenyl, substituted indenyl, unsubstituted fluorenyl and substituted fluorenyl. An exemplary list of substituents for a cyclopentadienyl-type ligand includes the group consisting of $C_{1-10}$ hydrocarbyl radicals (including phenyl and benzyl radicals), which hydrocarbyl substituents are unsubstituted or further substituted by one or more substituents selected from the group consisting of a halogen atom, preferably a chlorine or fluorine atom and a $C_{1-4}$ alkyl radical; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R^5)_3$ wherein each $R^5$ is independently selected from the group consisting of hydrogen, a $C_{1-8}$ alkyl or alkoxy radical, and $C_{6-10}$ aryl or aryloxy radicals; and germanyl radicals of the formula —Ge—$(R^5)_3$ wherein $R^5$ is as defined directly above.

If there are two such bulky ligands (i.e. bis-Cp) the catalysts are metallocene-type catalysts. The Cp ligand may be bridged to another Cp ligand by a silyl bridge or a short chain ($C_{1-4}$) alkyl radical. The Cp-type ligand may be bridged to an amido radical which may be further substituted by up to two additional substituents. Such bridged complexes are sometimes referred to as constrained geometry catalysts.

Broadly, the transition metal complex (or catalyst) suitable for use in the present invention has the formula:

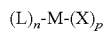

wherein M is a transition metal preferably selected from the group consisting of Ti, V, Zr, Hf, Cr, Fe, Co, Ni and Pd, most preferably selected from the group consisting of Ti, Hf and Zr (as described below); L is a monoanionic ligand independently selected from the group consisting of a cyclopentadienyl-type ligand, a bulky heteroatom ligand (as described below) and a phosphinimine ligand (as described below); X is an activatable ligand which is most preferably a simple monoanionic ligand such as an alkyl or a halide (as described below); n may be from 1 to 3, preferably 2 or 3; and p may be from 1 to 3, preferably 1 or 2, provided that the sum of n+p equals the valence state of M, and further provided that two L ligands may be bridged by a silyl radical or a $C_{1-4}$ alkyl radical.

If one or more of the L ligands is a phosphinimine ligand the transition metal complex may be of the formula:

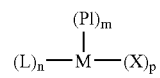

wherein M is a transition metal preferably selected from Ti, Hf and Zr (as described below); Pl is a phosphinimine ligand (as described below); L is a monoanionic ligand selected from the group consisting of a cyclopentadienyl-type ligand or a bulky heteroatom ligand (as described below); X is an activatable ligand which is most preferably a simple monoanionic ligand such as an alkyl or a halide (as described below); m is 1 or 2; n is 0 or 1; and p is an integer fixed by the valence of the metal M (i.e. the sum of m+n+p equals the valence state of M).

In one embodiment the catalysts are Group IV metal complexes in the highest oxidation state. For example, the catalyst may be a bis (phosphinimine) dichloride complex of titanium, zirconium or hafnium. Alternately, the catalyst contains one phosphinimine ligand, one "L" ligand (which is most preferably a cyclopentadienyl-type ligand) and two "X" ligands (which are preferably both chloride).

The preferred metals (M) are from Group IV (especially titanium, hafnium or zirconium) with titanium being most preferred.

The catalyst may contain one or two phosphinimine ligands which are covalently bonded to the metal. The phosphinimine ligand is defined by the formula:

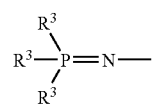

wherein each $R^3$ is independently selected from the group consisting of a hydrogen atom; a halogen atom; $C_{1-20}$, preferably $C_{1-10}$ hydrocarbyl radicals which are unsubstituted by or further substituted by a halogen atom; a $C_{1-8}$ alkoxy radical; a $C_{6-10}$ aryl or aryloxy radical; an amido radical; a silyl radical of the formula:

wherein each $R^4$ is independently selected from the group consisting of hydrogen, a $C_{1-8}$ alkyl or alkoxy radical, and $C_{6-10}$ aryl or aryloxy radicals; and a germanyl radical of the formula:

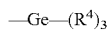

wherein $R^4$ is as defined above.

The preferred phosphinimines are those in which each $R^3$ is a hydrocarbyl radical, preferably a $C_{1-6}$ hydrocarbyl radical. A particularly preferred phosphinimine is tri-(tertiary butyl) phosphinimine (i.e. wherein each $R^3$ is a tertiary butyl group).

Preferred phosphinimine catalysts are Group IV organometallic complexes which contain one phosphinimine ligand (as described above) and one ligand L which is either a cyclopentadienyl-type ligand or a heteroligand.

As used herein, the term "heteroligand" refers to a ligand which contains at least one heteroatom selected from the group consisting of boron, nitrogen, oxygen, phosphorus or sulfur. The heteroligand may be sigma or pi-bonded to the metal. Exemplary heteroligands include ketimide ligands, silicon-containing heteroligands, amido ligands, alkoxy ligands, boron heterocyclic ligands and phosphole ligands, as all described below.

As used herein, the term "ketimide ligand" refers to a ligand which:

(a) is bonded to the transition metal via a metal-nitrogen atom bond;

(b) has a single substituent on the nitrogen atom (where this single substituent is a carbon atom which is doubly bonded to the N atom); and (c) has two substituents Sub 1 and Sub 2 (described below) which are bonded to the carbon atom.

Conditions a, b and c are illustrated below:

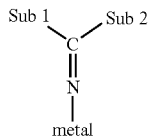

The substituents "Sub 1" and "Sub 2" may be the same or different. Exemplary substituents include hydrocarbyls having from 1 to 20 carbon atoms, silyl groups, amido groups and phosphido groups. For reasons of cost and convenience it is preferred that these substituents both be hydrocarbyls, especially simple alkyls and most preferably tertiary butyl.

Silicon containing heteroligands are defined by the formula:

wherein the — denotes a bond to the transition metal and µ is sulfur or oxygen.

The substituents on the Si atom, namely $R_x$, $R_y$ and $R_z$ are required in order to satisfy the bonding orbital of the Si atom. The use of any particular substituent $R_x$, $R_y$ or $R_z$ is not especially important to the success of this invention. It is preferred that each of $R_x$, $R_y$ and $R_z$ is a $C_{1-2}$ hydrocarbyl group (i.e. methyl or ethyl) simply because such materials are readily synthesized from commercially available materials.

The term "amido" is meant to convey its broad, conventional meaning. Thus, these ligands are characterized by (a) a metal-nitrogen bond; and (b) the presence of two substituents (which are typically simple alkyl or silyl groups) on the nitrogen atom.

The terms "alkoxy" and "aryloxy" is also intended to convey their conventional meaning. Thus, these ligands are characterized by (a) a metal oxygen bond; and (b) the presence of a hydrocarbyl group bonded to the oxygen atom. The hydrocarbyl group may be a C: lo straight chained, branched or cyclic alkyl radical or a $C_{6-13}$ aromatic radical which is unsubstituted or further substituted by one or more $C_{1-4}$ alkyl radicals (e.g. 2, 6 di-tertiary butyl phenoxy).

Boron heterocyclic ligands are characterized by the presence of a boron atom in a closed ring ligand. This definition includes heterocyclic ligands which also contain a nitrogen atom in the ring. These ligands are well known to those skilled in the art of olefin polymerization and are fully described in the literature (see, for example, U.S. Pat. Nos. 5,637,659; 5,554,775; and the references cited therein).

The term "phosphole" is also meant to convey its conventional meaning. "Phospholes" are cyclic dienyl structures having four carbon atoms and one phosphorus atom in the closed ring. The simplest phosphole is $C_4PH_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; or silyl or alkoxy radicals. Phosphole ligands are also well known to those skilled in the art of olefin polymerization and are described as such in U.S. Pat. No. 5,434,116 (Sone, to Tosoh).

The term "activatable ligand" or "leaving ligand" refers to a ligand which may be activated by the aluminoxane (also referred to as an "activator") to facilitate olefin polymerization. Exemplary activatable ligands are independently selected from the group consisting of a hydrogen atom; a halogen atom, preferably a chlorine or fluorine atom; a $C_{1-10}$ hydrocarbyl radical, preferably a $C_{1-4}$ alkyl radical; a $C_{1-10}$ alkoxy radical, preferably a $C_{1-4}$ alkoxy radical; and a $C_{5-10}$ aryl oxide radical; each of which said hydrocarbyl, alkoxy, and aryl oxide radicals may be unsubstituted by or further substituted by one or more substituents selected from the group consisting of a halogen atom, preferably a chlorine or fluorine atom; a $C_{1-8}$ alkyl radical, preferably a $C_{1-4}$ alkyl radical; a $C_{1-8}$ alkoxy radical, preferably a $C_{1-4}$ alkoxy radical; a $C_{6-10}$ aryl or aryloxy radical; an amido radical which is unsubstituted or substituted by up to two $C_{1-8}$, preferably $C_{1-4}$ alkyl radicals; and a phosphido radical which is unsubstituted or substituted by up to two $C_{1-8}$, preferably $C_{1-4}$ alkyl radicals.

The number of activatable ligands depends upon the valency of the metal and the valency of the activatable ligand. The preferred catalyst metals are Group IV metals in their highest oxidation state (i.e. $4^+$) and the preferred activatable ligands are monoanionic (such as a halide—especially chloride or $C_{1-4}$ alkyl—especially methyl). One useful group of catalysts contain a phosphihimine ligand, a cyclopentadienyl ligand and two chloride (or methyl) ligands bonded to the Group IV metal. In some instances, the metal of the catalyst component may not be in the highest oxidation state. For example, a titanium (III) component would contain only one activatable ligand.

As noted above, one group of catalysts is a Group IV organometallic complex in its highest oxidation state having a phosphinimine ligand, a cyclopentadienyl-type ligand and two activatable ligands. These requirements may be concisely described using the following formula for the preferred catalyst:

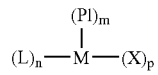

wherein M is a metal selected from Ti, Hf and Zr; Pl is as defined above, but preferably a phosphinimine wherein $R^3$ is a $C_{1-6}$ alkyl radical, most preferably a t-butyl radical; L is a ligand selected from the group consisting of cyclopentadienyl, indenyl and fluorenyl ligands which are unsubstituted or substituted by one or more substituents selected from the group consisting of a halogen atom, preferably chlorine or fluorine; $C_{1-4}$ alkyl radicals; and benzyl and phenyl radicals which are unsubstituted or substituted by one or more halogen atoms, preferably fluorine; X is selected from the group consisting of a chlorine atom and $C_{1-4}$ alkyl radicals; m is 1; n is 1; and p is 2.

In one embodiment of the present invention the transition metal complex may have the formula $[(CP)_qM[N=P(R^3)]_b X_c$ wherein M is the transition metal; Cp is a $C_{5-13}$ ligand containing a 5-membered carbon ring having delocalized bonding within the ring and bound to the metal atom through covalent $\eta^5$ bonds and said ligand being unsubstituted or up to fully substituted with one or more substituents selected from the group consisting of a halogen atom, preferably chlorine or fluorine; $C_{1-4}$ alkyl radicals; and benzyl and phenyl radicals which are unsubstituted or substituted by one or more halogen atoms, preferably fluorine; $R^3$ is a substituent selected from the group consisting of $C_{1-10}$ straight chained or branched alkyl radicals, $C_{6-10}$ aryl and aryloxy radicals which are unsubstituted or may be substituted by up to three $C_{1-4}$ alkyl radicals, and silyl radicals of the formula —Si—$(R^4)_3$ wherein $R^4$ is $C_{1-4}$ alkyl radical or a phenyl radical; L is selected from the group consisting of a leaving ligand; q is 1 or 2; b is 1 or 2; and the valence of the transition metal—(q+b)=c.

The polymerization in accordance with the present invention may be conducted as either a slurry or solution polymerization in an inert diluent or a gas phase polymerization.

Slurry polymerization processes are fairly well known in the art. These processes are conducted in the presence of an inert hydrocarbon solvent typically a $C_{4-12}$ hydrocarbon which may be unsubstituted or substituted by a $C_{1-4}$ alkyl group such as butane, pentane, hexane, heptane, octane, cyclohexane, methylcyclohexane or hydrogenated naphtha. An additional solvent is Isopar E ($C_{8-12}$ aliphatic solvent, Exxon Chemical Co.).

The polymerization may be conducted at temperatures from about 20° C. to about 180° C., preferably from about 20° C. to 120° C. and the polymer is insoluble in the liquid hydrocarbon phase (diluent) (e.g. a slurry polymerization). The pressure of the reaction may be as high as about 15,000 psig for the older high pressure processes or may range from about 15 to 4,500 psig.

In the gas phase polymerization of a gaseous mixture comprising from 0 to 15 mole % of hydrogen, from 0 to 30 mole % of one or more $C_{3-8}$ alpha olefins, from 15 to 100 mole % of ethylene, and from 0 to 75 mole % of an inert gas at a temperature from 50° C. to 120° C., preferably from 75° C. to about 110° C., and at pressures typically not exceeding 3,447 kPa (about 500 psi), preferably not greater than 2,414 kPa (about 350 psi).

Suitable olefin monomers may be ethylene and $C_{3-20}$ mono- and diolefins. Preferred monomers include ethylene and $C_{3-12}$ alpha olefins which are unsubstituted or substituted by up to two $C_{1-6}$ alkyl radicals. Illustrative non-limiting examples of such alpha olefins are one or more of propylene, 1-butene, 1-pentene, 4-methyl-1-pentene, 1-hexene, 1-heptene, 1-octene and 1-decene.

The polymers prepared in accordance with the present invention have a good molecular weight. That is, weight average molecular weight (Mw) will preferably be greater than about 30,000 ranging up to $10^7$, preferably $10^5$ to $10^7$. Hydrogen may be used in the polymerization to control the molecular weight of the polymer.

The polyethylene polymers which may be prepared in accordance with the present invention typically comprise not less than 60, preferably not less than 70, most preferably not less than 80 weight % of ethylene and the balance of one or more $C_{4-10}$ alpha olefins, preferably selected from the group consisting of 1-butene, 1-hexene and 1-octene.

The present invention will now be illustrated by the following non-limiting examples. In the examples unless otherwise indicated parts means part by weight (i.e. grams) and percent means weight percent.

EXPERIMENTAL

Polystyrene-divinyl benzene copolymer (PSt-DVB) (2% crosslinked, 200–400 mesh) was purchased from Aldrich. Aluminoxane with 12 weight % Al in toluene was purchased from Albemarle Corporation. The solvents (heptane, toluene and hexane) were deoxygenated and dried under nitrogen through columns of alumina, a deoxo catalyst and activated molecular sieves prior to use. All other commercially available reagents were used without further purification or drying. All supported catalyst preparations were carried out under an inert atmosphere of nitrogen, usually in a glovebox.

Example 1

Preparation of Support S1: Polystyrene-divinyl benzene copolymer (6.85 g) was slurried in 100 mL of heptane. $FSO_3H$ (0.344 g or 3.44 mmol) was then added dropwise. The mixture was shaken at room temperature for 18 hours, filtered, rinsed with heptane and the support was pumped to dryness.

Preparation of Catalyst C1: The Support S1 (0.68 g) was slurried toluene (30 mL) and an aluminoxane solution (1.80 g) was added. The resulting slurry was shaken for 2 hours.

(Indenyl)(tritertiarybutylphosphinimidyl)titanium dichloride (0.011 g or 0.024 mmol) dissolved completely in toluene was added slowly to the slurry. The combined mixture was shaken for an additional hour at room temperature. The supported catalyst was recovered by filtration, washed with toluene and pumped to dryness.

Polymerization: In a 2-litre autoclave reactor, 160 g of NaCl was added for use as a seedbed. The reactor was heated to 100° C. and thoroughly purged with first nitrogen and then ethylene gas. A 0.60 mL volume of tri-isobutyl aluminum in heptane solution (0.60 mmol) was injected into the reactor. After the reactor was cooled down to 90° C. and pressurized with 80 psig of ethylene, the Catalyst C1 (26 mg) was added and the reactor was pressurized with 200 psig of ethylene. The polymerization proceeded for 60 minutes with temperature maintained at 90° C. and pressure at 200 psig. The reaction was terminated by rapidly venting the reaction gases and cooling the reactor to room temperature. 33.8 g of polymer were recovered.

Example 2

Preparation of Support S2: Polystyrene-divinyl benzene copolymer (5.91 g) was slurried in heptane (100 mL). A tri-isobutyl aluminum solution (25.2 wt % in heptane, 11.63 g or 14.7 mmol) was added and the mixture was shaken overnight at room temperature. The solvent was removed by filtration, and the solid was rinsed and reslurried in heptane. $FSO_3H$ (0.30 g or 3.0 mmol) was added dropwise to the slurry and the mixture was shaken overnight at room temperature. The support was recovered by filtration, rinsed with heptane and vacuum dried.

Preparation of Catalyst C2: The procedure for preparing Catalyst C2 is similar to that described for Catalyst C1 described in the Example 1, except that Support S2 (2.13 g) was used instead of Support S1 (0.68 g).

Polymerization: The polymerization procedure is similar to that described in Example 1, except that Catalyst C2 (24 mg) was used instead, yielding 27.0 g of polymer.

Example 3

Preparation of Support S3: Polystyrene-divinyl benzene copolymer (20.0 g) was slurried in heptane (150 mL). A tri-isobutyl aluminum solution (25.2 wt % in heptane, 38.90 g or 50.0 mmol) was added to the slurry and the mixture was shaken overnight at room temperature. The solvent was removed by filtration, and the solid was rinsed and reslurried in heptane. $PhNMe_2$ (1.22 g or 10 mmol) was added dropwise and the slurry was shaken at room temperature for 30 minutes. $FSO_3H$ (1.01 g or 10.0 mmol) was added slowly to the mixture and the resulting slurry was shaken overnight at room temperature. The support was recovered by filtration, rinsed with heptane and vacuum dried.

Preparation of Catalyst C3: The procedure for preparing Catalyst C3 is similar to that of Catalyst C1 described in the Example 1, except that 2.01 g of Supported S3 was used instead of 0.68 g of Support S1.

Polymerization: The polymerization procedure is similar to that described in Example 1, except that Catalyst C3 (25 mg) was used instead, yielding 33.8 g of polymer.

Comparative Example 1

Preparation of the Catalyst Com 1: Polystyrene-divinyl benzene copolymer (1.99 g) was slurried in toluene (50 mL). An aluminoxane solution containing 12 weight % Al in toluene (4.23 g) was added to the slurry and shaken mechanically. After 2 hours, (indenyl)(tritertiarybutylphosphinimidyl) titanium dichloride (0.028 g or 0.062 mmol) dissolved in toluene was added to the slurry. The combined mixture was shaken for 1 hour at room temperature. The supported catalyst was recovered by filtration, washed with toluene and pumped to dryness.

Polymerization: The polymerization procedure is similar to that described in Example 1, except that Catalyst Com 1 (26 mg) was used instead, yielding 13.4 g of polymer.

Example 4

Preparation of the Catalyst C4: The Support S3 (1.60 g) was slurried in 50 mL of anhydrous toluene. An aluminoxane solution containing 12 weight % Al in toluene (4.26 g) was added to the slurry and shaken mechanically for 2 hours. Bis(n-butyl cyclopentadienyl)zirconium dichloride 0.024 g or 0.059 mmol) dissolved in anhydrous toluene was added slowly to the slurry. The combined mixture was shaken for 1 hour at room temperature. The supported catalyst was recovered by filtration, washed with toluene and pumped to dryness.

Polymerization: The polymerization procedure is similar to that described in Example 1, except that Catalyst C4 (26 mg) was used instead, yielding 22.4 g of polymer.

Comparative Example 2

Preparation of Catalyst Com 2: Polystyrene-divinyl benzene copolymer (1.01 g) was slurried in toluene (50 mL). An aluminoxane solution containing 12 weight % Al in toluene (2.68 g) was added to the slurry and shaken mechanically. After 2 hours, bis(n-butyl cyclopentadienyl)zirconium dichloride (0.015 g or 0.037 mmol) dissolved in toluene was added to the slurry. The combined mixture was shaken for 1 hour at room temperature. The supported catalyst was recovered by filtration, washed with toluene and pumped to dryness.

Polymerization: The polymerization procedure is similar to that described in Example 1, except that Catalyst Com 2 (25 mg) was used instead, yielding 1.2 g of polymer.

TABLE 1

| Example # | Catalyst # | Transition Metal Complexes | Support # | Support Treatment Reagents | Productivity (g polymer/g catalyst) |
|---|---|---|---|---|---|
| 1 | C1 | (Indenyl)(tritertiarybutyl phosphinimidyl) titanium dichloride | S1 | $FSO_3H$ | 1,300 |
| 2 | C2 | (Indenyl)(tritertiarybutyl phosphinimidyl) titanium dichloride | S2 | $TiBAL/FSO_3H$ | 1,125 |
| 3 | C3 | (Indenyl)(tritertiarybutyl phosphinimidyl) titanium dichloride | S3 | $TiBAL/PhNMe_2/FSO_3H$ | 1,352 |
| Com 1 | Com 1 | (Indenyl)(tritertiarybutyl phosphinimidyl) titanium dichloride | PSt-DVB | none | 515 |
| 4 | C4 | Bis(n-butyl cyclopentadienyl) zirconium dichloride | S3 | $TiBAL/PhNMe_2/FSO_3H$ | 862 |
| Com 2 | Com 2 | Bis(n-butyl cyclopentadienyl) zirconium dichloride | PSt-DVB | none | 48 |

What is claimed is:

1. A catalyst system comprising a polymeric support having a particle size 1 to 300 microns, a surface area from 100 to 1,500 $m^2/g$ and a pore volume of at least 0.1 $cm^3/g$, a co-catalyst in an amount from 0.01 to 0.8 g per g of support, said co-catalyst having the formula $R^1{}_2AlO(R^1AlO)_m AlR^1{}_2$ wherein each $R^1$ is indenendently selected from $C_{1-20}$ hydrocarbyl radicals and m is from 3 to 50, said support comprising the suspension or emulsion polymerization product of a feedstock comprising:

(i) from 60 to 99 weight % of one or more $C_{4-12}$ vinyl monomers selected from the group consisting of styrene, alpha-methyl styrene, para-methyl styrene and C$_{1-4}$ alkyl esters of C$_{3-6}$ unsaturated carboxylic acids; and (ii) from 40 to 1 weight % of a crosslinking agent selected from the group consisting of divinyl benzene, divinyl toluene, pentaerythritol di- and tri-acrylates and pentaerythritol di- and tri-methacrylates;

and said support being treated with, (iii) from 0.01 to 5 mmol per gram of support of a halosulfonic acid;

(iv) from 0 to 10 mmol per gram of support of a compound of the formula M (R$^2$)$_a$(OR$^2$)$_b$(X)$_c$ wherein M is a metal atom selected from the group consisting of Mg, Al and Zn, R$^2$ is a C$_{1-10}$ alkyl radical and a, b, and c are integers from 0 to 3 provided the sum of a+b+c=the valence of M; and (v) from 0 to 5 mmol per gram of support of a bulky amine; and a catalyst of the formula:

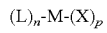

wherein M is a transition metal; L is a monoanionic ligand independently selected from the group consisting of a cyclopentadienyl-type ligand, a bulky heteroatom ligand and a phosphinimine ligand; X is an activatable ligand; n is from 1 to 3; and p is from 1 to 3, provided that the sum of n+p equals the valence state of M, and further provided that two L ligands may be bridged by a silyl radical or a C$_{1-4}$ alkyl radical, wherein a molar ratio of aluminum from the co-catalyst to transition metal is from 20:1 to 300:1.

2. The catalyst system according to claim 1, wherein M is selected from the group consisting of Ti, Zr and Hf.

3. The catalyst system according to claim 2, wherein the cyclopentadienyl-type ligand is a C$_{5-13}$ ligand containing a 5-membered carbon ring having delocalized bonding within the ring and bound to the metal atom through covalent $\eta^5$ bonds, said ligand being unsubstituted or up to fully substituted with one or more substituents selected from the group consisting of C$_{1-10}$ hydrocarbyl radicals in which hydrocarbyl substituents are unsubstituted or further substituted by one or more substituents selected from the group consisting of a halogen atom and a C$_{1-4}$ alkyl radical; a halogen atom; a C$_{1-8}$ alkoxy radical; a C$_{6-10}$ aryl or aryloxy radical; an amido radical which is unsubstituted or substituted by up to two C$_{1-8}$ alkyl radicals; a phosphido radical which is unsubstituted or substituted by up to two C$_{1-8}$ alkyl radicals; silyl radicals of the formula —Si—(R$^5$)$_3$ wherein each R is independently selected from the group consisting of hydrogen, a C$_{1-8}$ alkyl or alkoxy radical, and C$_{6-10}$ aryl or aryloxy radicals; and germanyl radicals of the formula Ge—(R$_5$)$_3$ wherein R$^5$ is as defined above.

4. The catalyst system according to claim 3, wherein X is selected from the group consisting of a hydrogen atom; a halogen atom, a C$_{1-10}$ hydrocarbyl radical; a C$_{1-10}$ alkoxy radical; and a C$_{5-10}$ aryl oxide radical; each of which said hydrocarbyl, alkoxy, and aryl oxide radicals may be unsubstituted by or further substituted by one or more substituents selected from the group consisting of a halogen atom; a C$_{1-8}$ alkyl radical; a C$_{1-8}$ alkoxy radical; a C$_{6-10}$ aryl or aryloxy radical; an amido radical which is unsubstituted or substituted by up to two C$_{1-8}$ alkyl radicals; and a phosphido radical which is unsubstituted or substituted by up to two C$_{1-8}$ alkyl radicals.

5. The catalyst system according to claim 4, wherein the bulky heteroatom ligand is selected from the group consisting of ketimide ligands, silicon-containing heteroligands, amido ligands, alkoxy ligands, boron heterocyclic ligands and phosphole ligands.

6. The catalyst system according to claim 4, wherein the bulky heteroatom ligand is a phosphinimine ligand of the formula:

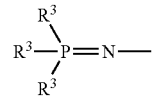

wherein each R$^3$ is independently selected from the group consisting of a hydrogen atom; a halogen atom; C$_{1-10}$ hydrocarbyl radicals which are unsubstituted by or further substituted by a halogen atom; C$_{1-8}$ alkoxy radicals; C$_{6-10}$ aryl or aryloxy radicals; an amido radical; a silyl radical of the formula:

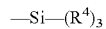

wherein each R$^4$ is independently selected from the group consisting of hydrogen, C$_{1-8}$ alkyl or alkoxy radicals, and C$_{6-10}$ aryl or aryloxy radicals; and a germanyl radical of the formula:

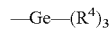

wherein R$^4$ is as defined above.

7. The catalyst system according to claim 6, wherein the phosphinimine ligand each R$^3$ is independently selected from C$_{3-6}$ alkyl radicals.

8. The catalyst system according to claim 1, wherein in the support preparation the vinyl monomer is styrene and is present in an amount from 90 to 98 weight %.

9. The catalyst system according to claim 8, wherein in the support preparation the crosslinking agent is divinyl benzene.

10. The catalyst system according to claim 9, wherein in the support preparation component (iii) is fluorosulfonic acid and is present in an amount from 0.1 to 3 mmol per gram of support.

11. The catalyst system according to claim 10, wherein in the support preparation component (iv) is tri-isobutyl aluminum and is present in an amount from 1 to 3 mmol per gram of support.

12. The catalyst system according to claim 11, wherein in the support preparation component (v) is phenyl dimethyl amine and is present in an amount from 0.1 to 2 mmol per gram of support.

13. The catalyst system according to claim 12, wherein in the support preparation in the co-catalyst R$^1$ is predominantly a C$_{1-4}$ alkyl radical and m is from 3 to 30.

* * * * *